United States Patent
James

(10) Patent No.: US 12,110,113 B2
(45) Date of Patent: Oct. 8, 2024

(54) AIRCRAFT PASSENGER SEAT UNIT INCLUDING SURROUNDING SHELL DEFINING A SEAT PLANFORM

(71) Applicant: Safran Seats GB Limited, Cwmbran (GB)

(72) Inventor: Rachel James, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 288 days.

(21) Appl. No.: 17/611,509

(22) PCT Filed: May 15, 2020

(86) PCT No.: PCT/GB2020/051190
§ 371 (c)(1),
(2) Date: Nov. 15, 2021

(87) PCT Pub. No.: WO2020/229836
PCT Pub. Date: Sep. 19, 2020

(65) Prior Publication Data
US 2022/0212803 A1 Jul. 7, 2022

(30) Foreign Application Priority Data
May 16, 2019 (GB) ..................................... 1906923

(51) Int. Cl.
*B64D 11/06* (2006.01)
(52) U.S. Cl.
CPC ...... *B64D 11/0606* (2014.12); *B64D 11/0601* (2014.12); *B64D 11/0641* (2014.12)
(58) Field of Classification Search
CPC ............ B64D 11/0601; B64D 11/0606; B64D 11/0641
(Continued)

(56) References Cited

U.S. PATENT DOCUMENTS 9,856,025 B2 * 1/2018 Jasny .................. B64D 11/0647
2010/0038485 A1 2/2010 Harcup
(Continued)

FOREIGN PATENT DOCUMENTS

EP 2154067 A2 2/2010
EP 1963132 B1 7/2010
(Continued)

OTHER PUBLICATIONS

International Patent Application No. PCT/GB2020/051190, International Search Report and Written Opinion, dated Aug. 24, 2020.
(Continued)

*Primary Examiner* — Brady W Frazier
(74) *Attorney, Agent, or Firm* — Kilpatrick Townsend & Stockton LLP

(57) ABSTRACT

The present invention provides, an aircraft passenger seat unit comprising a convertible passenger seat, a shell defining a planform of the seat unit, the planform having a first end region across a first end of the planform, a second end region across the second end of the planform, and a middle region extending from the first end region to the second end region, wherein the second end region is offset from the first end region in a direction transverse to the length of the planform, the shell further comprising a moveable partition being moveable between a raised position and a lowered position, in which a sight line is unblocked, wherein the moveable partition is located adjacent the middle region and wherein, when in the lowered position, the partition is located under the bed height of the converted passenger seat.

17 Claims, 3 Drawing Sheets

(58) Field of Classification Search
USPC .................................................... 244/118.6
See application file for complete search history.

(56) References Cited

U.S. PATENT DOCUMENTS

| | | | | |
|---|---|---|---|---|
| 2010/0065683 A1* | 3/2010 | Darbyshire | ........ | B64D 11/0604 |
| | | | | 244/118.6 |
| 2014/0361585 A1 | 12/2014 | Henshaw | | |
| 2015/0360783 A1* | 12/2015 | Cailleteau | .............. | B64D 11/06 |
| | | | | 244/118.6 |
| 2018/0105273 A1* | 4/2018 | Robinson | ........... | B64D 11/0606 |
| 2019/0315468 A1* | 10/2019 | White | ................ | B64D 11/0605 |
| 2019/0344895 A1* | 11/2019 | Kimizuka | .......... | B64D 11/0604 |

FOREIGN PATENT DOCUMENTS

| | | | |
|---|---|---|---|
| EP | 2907754 | A1 | 8/2015 |
| FR | 3059951 | A1 | 6/2018 |
| GB | 2510765 | B | 12/2016 |
| WO | 2003013903 | A1 | 2/2003 |
| WO | 2016164564 | A1 | 10/2016 |
| WO | 2018078374 | A1 | 5/2018 |
| WO | 2018078375 | A1 | 5/2018 |
| WO | 2018078376 | A1 | 5/2018 |
| WO | 2018078377 | A1 | 5/2018 |

OTHER PUBLICATIONS

United Kingdom Patent Application No. 1906923.6, Search Report, dated Oct. 21, 2019.

\* cited by examiner

AIRCRAFT PASSENGER SEAT UNIT INCLUDING SURROUNDING SHELL DEFINING A SEAT PLANFORM

CROSS-REFERENCE TO RELATED APPLICATIONS

This application is a national stage application of International Patent Application No. PCT/GB2020/051190, filed on May 15, 2020, and titled "An Aircraft Passenger Seat Unit," which is related to and claims priority benefits from United Kingdom Patent Application No. 1906923.6, filed on May 16, 2019, and titled "An Aircraft Passenger Seat Unit," both of which are hereby incorporated by reference in their entireties.

BACKGROUND OF THE INVENTION

The present disclosure relates to aircraft passenger seating, especially for business class and first class passengers.

The present invention concerns an aircraft passenger seat unit. More particularly, but not exclusively, this invention concerns an aircraft passenger seat unit comprising a passenger seat, the passenger seat having a seat pan and a backrest and the passenger seat being convertible between a seat configuration and a bed configuration, in which there is provided a bed surface at a bed height, a shell at least partially surrounding the passenger seat and defining a planform of the seat unit, the planform having a length from a first end of the planform to a second opposite end of the planform, a first end region across the first end of the planform, a second end region across the second end of the planform, and a middle region extending from the first end region to the second end region.

The invention also concerns two aircraft passenger seat units, an aircraft seating cabin arrangement, and a kit of parts.

Various prior art aircraft cabin arrangements and associated aircraft passenger seat units are known. Examples for use in business class or first class include the arrangements and/or seat units shown in WO 03/013903, WO 2018078374 and EP 1963132. However, in all of these examples, it is not possible to provide access between a pair of seat units. Instead, each seat is kept relatively separate from an adjacent seat. For example, there may simply be a partition (to allow a sight line between the units) between the seats of the two units.

The present invention seeks to mitigate the above-mentioned problems. Alternatively or additionally, the present invention seeks to provide an improved aircraft passenger seat unit.

SUMMARY OF THE INVENTION

The present invention provides, according to a first aspect, an aircraft passenger seat unit comprising a passenger seat, the passenger seat having a seat pan and a backrest and the passenger seat being convertible between a seat configuration and a bed configuration, in which there is provided a bed surface at a bed height, a shell at least partially surrounding the passenger seat and (at least partially) defining a planform of the seat unit, the planform having a length from a first end of the planform to a second opposite end of the planform, a first end region across the first end of the planform, a second end region across the second end of the planform, and a middle region extending from the first end region to the second end region, wherein the second end region is offset from the first end region in a direction transverse to the length of the planform, the second end region being offset by an offset distance, the shell further comprising a moveable partition, the moveable partition being moveable between a raised position, in which it blocks a sight line to or from the seat unit, and a lowered position, in which the sight line is unblocked, wherein the moveable partition is located adjacent the middle region and wherein, when in the lowered position, the partition is located under the bed height.

By having a partition that, in its lowered position, is located under the bed height allows for access between the seat unit and another adjacent seat unit. For example, a double bed could be effectively provided that spans the two units above the lowered partition. The double bed surface could be effectively formed by the converted bed surface of the claimed unit and a bed surface of the adjacent unit, the two adjacent units being close to each other and only separated by a small gap approximately the width of the moveable partition. The moveable partition is able to be out of the way in its lowered position so it does not encroach on the double bed space. This enables two acquainted passengers to have adjacent seats and be able to have a larger shared bed area. On the other hand, if the passengers are not acquainted then the two seat units can simply function with two separate seats and two separate beds. This provides a flexible seat arrangement, allowing for both acquainted and non-acquainted passengers.

It is also noted that having an offset second region and the moveable partition being located in between the first and second regions allows the seat unit to be arranged with other like units at an angle to the longitudinal axis of the cabin and therefore provide a column of similar seat units, each seat unit having a large effective space. For example, without having a second region being offset from the first region, the space behind a passenger seat is often wasted as it cannot be effectively used by the passenger in that seat. By having the second end region offset from the first end region, allows the seat units (and the seats within them) to be arranged at a desired angle to the longitudinal axis of the cabin, whilst also allowing a space behind a seat to be used by a passenger in an adjacent seat unit, in a more effective way. For example, instead of the space being behind the seat (and effectively blocked by the backrest), the space can instead be used by a passenger of an adjacent seat unit, as it is located at the side of their adjacent seat.

Having a middle region that extends between the two end regions allows a smooth profile of the seat unit to make the seat units feel roomy whilst also allowing the seat units to tessellate with similar seat units.

Hence, the present invention provides a versatile seat unit and versatile resulting cabin arrangement, with efficient use of space.

In the context of the invention, the term transverse corresponds to width of the seat unit.

The passenger seat may be convertible between the seat and bed configurations using a recline mechanism. Alternatively, the passenger seat may be a bench style seat, without a recline mechanism.

The entire length of the moveable partition may be located under the bed height. The bed height may be 350 to 400, preferably 375 to 385, for example 381 mms above the lowest point of the seat unit. The bed height may be 380 to 430, preferably 400 to 410, for example 406 mms above the cabin floor when installed in an aircraft cabin. The raised height of the moveable partition may be greater than 1000 mm, 1270 mm or 1520 mm above the lowest point of the seat unit (corresponding to the raised height above the cabin floor when installed in an aircraft cabin). The lowered height of the moveable partition may 340 to 390, and preferably 365 to 375, for example 368 mms above the lowest point of the seat unit (corresponding to the lowered height above the cabin floor when installed in an aircraft cabin).

The first end region may be substantially rectangular. The second end region may be substantially rectangular.

The shell may define a side of the seat unit. The shell may define two opposing sides of the seat unit.

The sides of the seat units defined by the shell may act to delineate one seat unit from another. In other words, there is no overlap (when viewed in plan) of one seat unit and another. In other words, the sides of the seat units may have a substantially vertical orientation within the seat unit.

Preferably, the first end region has a first width and the second end region has a second width. The first or second width may extend across the entire first end or second end, respectively. In other words, the first or second widths may extend across the width of planform.

More preferably, the first width and the second width are substantially the same such that the width of the planform at the first end is substantially the same as the width of the planform at the second end.

Preferably, the middle region has a third width and wherein the third width is substantially the same as the first width and/or the second width.

The planform may have a constant width. This makes the units easier to tessellate with similar units. The constant, first, second or third widths may be less than 1300 mm or less than 1150 mm.

Preferably, the moveable partition is located adjacent the middle region along substantially the whole length of the middle region. It may be located along at least 90% of the length of middle region. This allows for significant access between the unit and an adjacent unit at the bed height. This provides for a useful double bed surface to be provided between two units.

More preferably, the moveable partition is also located adjacent the first end region and/or adjacent the second end region. It may be located along at least 90% of the length of the entire planform. This allows for significant access between the unit and an adjacent unit at the bed height. This provides for a useful double bed surface to be provided between two units.

Preferably, the middle region has a planform in the shape of a parallelogram.

The partition, if located only adjacent the middle region, may form a substantially straight line. This line corresponds to the side of the parallelogram. If the partition is also located adjacent the first or second end region, it may be formed of two substantially straight sections, angled with respect to each other, to correspond to the side of the first or second end region and the middle region. If the partition is also located adjacent first and second end regions, it may be formed of three substantially straight sections, angled with respect to each other, to correspond to the sides of the first end region, middle region and second end region.

The straight sections corresponding to the first and second end regions may be substantially parallel to each other. The seat may be angled with respect to these straight section(s) corresponding to the first and/or second end regions. The seat may be angled with respect to the straight section corresponding to the middle region.

Preferably, the middle region has a planform defined by two S-shape sides.

The partition, if located only adjacent the middle region, may form a substantially S-shaped section. This S-shaped section corresponds to side of the planform of the middle region. If the partition is also located adjacent the first or second end region, it may be formed of one substantially straight section, corresponding to the side of the first or second end region and a substantially S-shaped section, corresponding to the side of the planform of the middle region. If the partition is also located adjacent first and second end regions, it may be formed of two substantially straight sections; one corresponding to the side of the first end region and one corresponding to the side of the second end region, and a substantially S-shaped section, in between the two substantially straight sections, corresponding to the side of the planform of the middle region.

The straight sections corresponding to the first and second end regions may be substantially parallel to each other. The seat may be angled with respect to these straight section(s) corresponding to the first and/or second end regions. The seat may be angled with respect to a straight line drawn from one end of the S-shaped section corresponding to the middle region to the other end of the S-shaped section corresponding to the middle region. In other words, the seat may be angled with respect to the effective angle of the middle region.

The S-shaped sections may comprise a first end portion that is tangential to the first end region and may have a second end portion that is tangential to the second end region. The S-shaped section first and/or second end portion may meet and/or join to the first end region and/or second end region where they are tangential.

Preferably, the offset distance of the second end region is 30% to 70%, preferably 40 to 60%, and more preferably approximately 50% of the width of the first end region, second end region or middle region. The offset distance of the second end region may be 45-55% of the width of the first end region, second end region or middle region.

Preferably, the length of the planform is approximately 200% to 250%, and more preferably 215% to 235%, of the width of the first end region, second end region or middle region. The length of the planform may be 220-230% and may be substantially 225% of the width of the first end region, second end region or middle region.

Preferably, a planform angle is between 20 and 45 degrees, and more preferably between 30 and 40 degrees. The planform angle is defined as the angle of a line, running from the middle of the first end to the middle of the second end, to a line that is perpendicular to the width/offset direction (i.e. the length of the planform). The planform angle is a measure of the offset distance relative to the length of the seat unit.

Preferably, the backrest of the passenger seat, when in the seat configuration, is located towards the first end of the planform.

More preferably, the shell surrounds the back of the backrest of the passenger seat. In other words, the first end is effectively fully closed. In other words, the first end is completely surrounded. In other words, there is no access to the seat unit (inside the shell and/or the seat side of the shell) and/or no access to the seat at the first end.

Preferably, the seat unit comprises an ottoman located towards the second end of the planform. The ottoman may provide part of the bed surface.

More preferably, the ottoman is located on one side of the second end of the planform.

Even more preferably, the shell at least partially surrounds a side of the ottoman facing the second end of the planform. In other words, the second end is partially closed. In other words, there is no access to the seat unit (inside the shell and/or the seat side of the shell) and/or no access to the seat via the ottoman.

Preferably, an accessway into the seat unit is provided on the opposite side of the second end of the planform to the side where the ottoman is located. In other words, the shell does not surround the opposite end of the second end of the planform. In other words, the second end is at least partially open to allow access to the seat unit (inside the shell and/or the seat side of the shell) and/or access to the seat.

According to a second aspect of the invention there is also provided two aircraft passenger seat units, each aircraft passenger seat unit being as described above in relation to the first aspect, wherein the two aircraft passenger seat units are arrangeable side-by-side so that a moveable partition of one of the seat units is adjacent the other seat unit, and such that the moveable partition is moveable to the lowered position under the bed height so as to provide for passage between the two seat units above the bed height.

This allows, for example, a double bed to be effectively provided that spans the two units above the lowered partition. The double bed surface could be effectively formed by the converted bed surface of the both seat units being close to each other and only separated by a small gap approximately the width of the moveable partition of one of the units. The moveable partition is able to be out of the way in its lowered position so it does not encroach on the double bed space. This enables two acquainted passengers to have adjacent seats and be able to have a larger shared bed area. On the other hand, if the passengers are not acquainted then the two seat units can simply function with two separate seats and two separate beds. This provides a flexible seat arrangement, allowing for both acquainted and non-acquainted passengers.

Preferably, the two seat units are arrangeable side-by-side such that the two passenger seats face in the same direction and/or arrangeable such that the two passenger seats face in opposite directions.

According to a third aspect of the invention there is also provided an aircraft seating cabin arrangement, wherein the arrangement comprises a column of a plurality of aircraft passenger seat units as described above in relation to the first aspect, the column extending longitudinally along an aircraft cabin (i.e. along the longitudinal cabin axis), and wherein the aircraft passenger seat units are arranged side-by-side in the column such that the moveable partition of each of the seat units is located adjacent another seat unit in the column.

The seat units may be arranged at an angle to the longitudinal cabin axis.

Preferably, the arrangement comprises at least three columns, including at least one middle column and two outer columns, the middle columns being separated on each of their two longitudinal sides from another of the columns by an aisle and wherein the middle columns are provided by columns as described above.

More preferably, the arrangement comprises at least four columns, including at least two middle columns and two outer columns, wherein the middle columns are provided by columns as described above.

Preferably, the outer columns are provided with aircraft passenger seat units at a different pitch and/or angle to the aircraft passenger seat units of the middle column(s).

The cabin arrangement may comprise a 1-1-1, 1-2-1 or 1-1-1 arrangement (the numerals referring to the number of seats, separated by aisles designated as "-"). The middle columns may be as described above. The outer columns may not be as described above. Alternatively, the cabin arrangement may comprise a 1-1 arrangement, whereby at least one of columns may be as described above.

According to a fourth aspect of the invention there is also provided a kit of parts comprising a passenger seat and a shell suitable for forming an aircraft passenger seat unit as described above in relation to the first aspect.

Preferably, the kit of parts comprises two passenger seats and two shells suitable for forming two aircraft passenger seat units as described above in relation to the second aspect.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
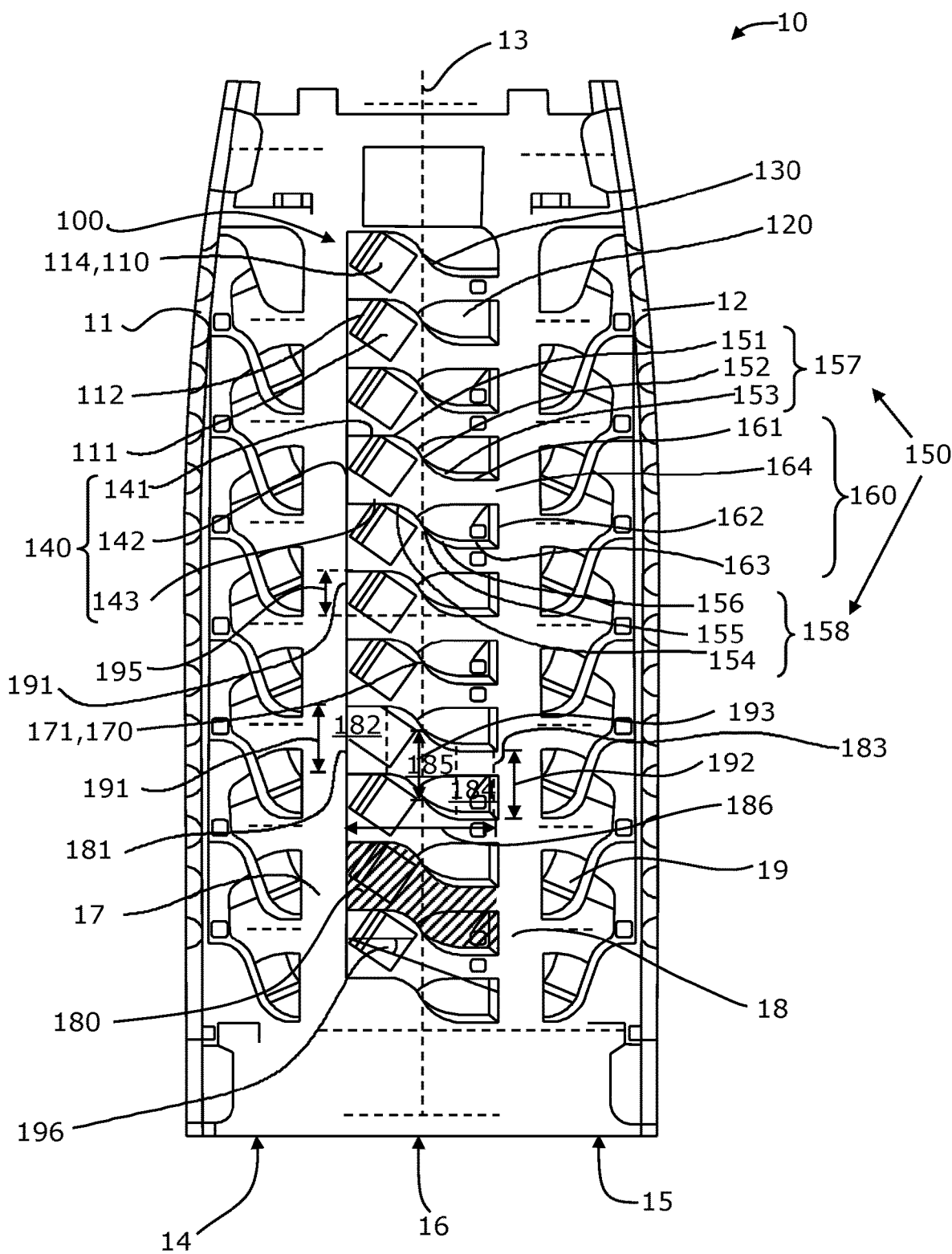
FIG. 1 shows a plan view of an aircraft cabin arrangement including aircraft passenger seat units according to a first embodiment of the invention.

FIG. 1 shows a plan view of an aircraft cabin arrangement 10 including aircraft passenger seat units 100 according to a first embodiment of the invention. The cabin 10 has a left hand side cabin wall 11 and a right hand side cabin wall 12 (directions as looking in direction of travel towards front of cabin, at the top of the Figure). The cabin has a longitudinal axis, shown by the dashed line labelled 13.

Eleven of the seat units 100 according to the invention form a middle column 16 of the cabin. Also shown is a left hand side column 14 and a right hand side column 15. In these side columns 14, 15 the seat units 19 are not in accordance with the invention. There are 14 such seat units 19 (7 in each of the side columns 14, 15). The side columns 14, 15 and middle column 16 are separated from each other by a left hand aisle 17 and a right hand aisle 18.

Importantly, it can be seen that the pitch of the seat units 100 is much shorter than the pitch of the seat units 19. This can be seen by comparing the number of seat units 100 (eleven) to the number of seat units 19 (seven) in the columns shown, occupying the same length along the cabin 10. This is achieved by the seat units 100 (and in particular, the seats of the seat units) being angled so as to extend in a direction that is further angled away from the longitudinal axis. In other words, the seat units 100 are angled more transversely to the longitudinal axis of the cabin, than the seat units 19 are.

Looking at the middle column 16 of seat units 100, it is noted that each seat unit 100 is similar. For ease, various reference numerals have been used in the following description and these are distributed along the column 16 in the Figure, rather than labelled to a single seat 100 in the column. However, it is noted that the various described features apply to all the seat units 100 in the middle column 16.

Figure 2:
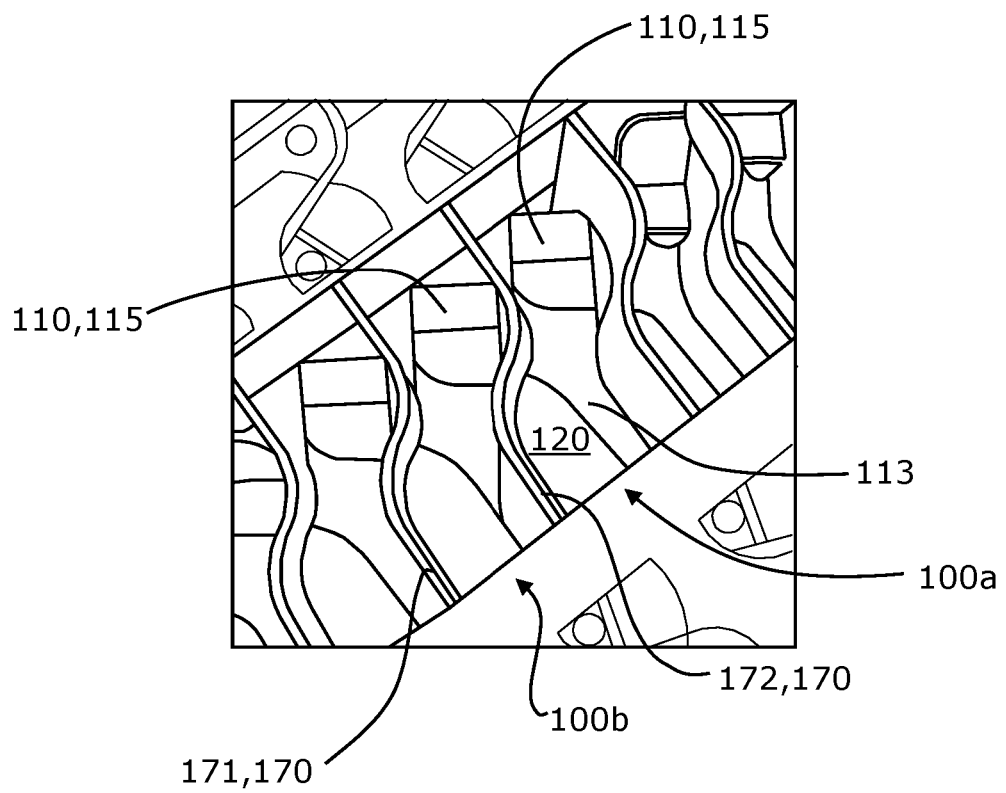
FIG. 2 shows a close-up view of two of the aircraft passenger seat units of FIG. 1, in a bed configuration and with a moveable partition in a lowered position.

It is noted that each seat unit 100 has a seat 110 inside the unit. Each seat 110 comprises a conventional seat pan 111, seat back 112 and leg rest 113. The seats 110 can move, using a recline mechanism, between a seat configuration 114 (as in FIG. 1) and a bed configuration 115 (as shown in FIG. 2), in a conventional manner. The seat 100 is located towards a left hand side of the seat unit.

Each seat unit 100 is also provided with an ottoman 120, which forms part of the bed surface of the bed configuration of the seat 110. This can be seen in FIG. 2. The ottoman 120 is located towards a right hand side of the seat unit.

Each seat unit 100 has a planform 180, shown by hatched lines. The planform 180 is defined by a shell structure 130 surrounding the seat 110 of each unit 100.

The planform 180 (and therefore each seat unit 100) has a first end 181 (near the seat 110) and a second end 183 (near the ottoman 120). There is a rectangular first end region 182 at the first end 181 and a similar rectangular second end region 184 at the second end 183. A middle region 185 joins the two end regions.

A length of the planform, shown by arrow 186, is defined as the length of thie unit transverse to the longitudinal axis of the cabin 130. The length 186 is 193 cm.

The width of the planform at any given point is defined by the dimension in the longitudinal cabin axis 13 direction. Hence, the width of the first end region is shown by arrow 191, the width of the second end region is shown by arrow 192 and the width of the middle region is shown by arrow 193. These widths are all the same and are 86.6 cm. This is also the effective pitch of the seat units.

Importantly, the second end region 183 is offset from the first end region 182 in an offset direction, labelled 194, by an offset distance 195. This offset direction 194 is in the longitudinal cabin axis 13 direction.

The offset distance 195 is defined by the distance (in the offset direction 194) between a point on the first end region 182 and a corresponding point on the second end region 184. In FIG. 1, the point used is the forwards-most point of the first and second end regions. The offset distance 185 is 55.8 cm.

An angle, labelled as 196, of the planform 180 is defined by the angle formed between line extending from i) a point on the first end region 182 to ii) a corresponding point on the second end region 184, and a line extending transversely to the cabin longitudinal axis 13. In FIG. 1, the point used is the middle point of the first and second end regions. The planform angle 196 is 34 degrees.

The seat 110 is located towards the first end 181 and the ottoman 120 towards the second end 183. The seat faces towards the ottoman 120, in a direction slightly backwards from the forwards flight direction of the cabin.

A passenger in a specific seat 110 has the perspective that they are contained within the unit corresponding to that seat, by a shell extending around them. Of course, that does not mean that the shell surrounding them is necessarily an integral part of the unit they are sat in. In fact, a shell on one side of the passenger could be attributed to the unit they are in and the shell on the opposite side could be attributed to a different unit located adjacent to that opposite side of the unit. Only one shell is required between two seats, for privacy purposes. When describing the seat units 100 below, the shell structure 130 will be described in relation to the different parts of the shell surrounding a seat 110. Of course, this is made up from different shell parts some of which may be formed with the unit of that seat, and others may be formed with shell parts that form part of an adjacent seat, as will be explained.

Each seat 110 is surrounded by a shell structure 130 made up of the following shell portions, as seen by a passenger sitting in the seat 110 and facing towards the ottoman 120:

i) a first end region shell portion 140; made up of left first end region shell portion 141 to the left of the seat 110, a head-end first end region shell portion 142 behind the seat 110 and right first end region shell portion 143 to the right of the seat 110, ii) a second end region shell portion 160; made up of left second end region shell portion 161, a foot-end second end region shell portion 162 and right second end region shell portion 163, and iii) a middle region shell portion 150 made up of left middle region shell portion 157 and right middle region shell portion 158.

It is pointed out that in the second end region shell portion 160, the foot-end region shell portion 162 does not extend across the width of the second end and thus, there is provided an accessway 164 into the seat unit 100 at the second end 183, from aisle 18.

The left middle region shell portion 157 comprises a slightly curved portion 151 which is tangential to left first end region shell portion 141, and a slightly curved portion 153 which is tangential to left second end region shell portion 161, and a significantly S-shaped curved portion 152, which joins portions 151 and 152. Hence, the left middle region shell portion 157 provides an S-shaped shell extending between the left side of the first end region and the left side of the second end region.

Similarly, the right middle region shell portion 158, which has the same shape as the left middle region shell portion 157, comprises a slightly curved portion 154 which is tangential to right first end region shell portion 143, and a slightly curved portion 156 which is tangential to right second end region shell portion 163, and a significantly S-shaped curved portion 155, which joins portions 154 and 156. Hence, the right middle region shell portion 158 provides an S-shaped shell extending between the right side of the first end region and the right side of the second end region.

The S-shapes of the shell portions 157, 158 are the same so that the width across the middle region 185 is constant, despite the S-shape of the sides of the middle region 185.

Shell portions 142 and 162 are considered to always be part of the unit in question. Those shell portions on the left side of the unit (i.e. 141, 151, 152, 153, 157, 161) can be considered to be part of the unit 100 or the left adjacent unit. Those shell portions on the right side of the unit (i.e. 143, 154, 155, 156, 158, 163) can be considered to be part of the unit 100 or the right adjacent unit. However, if the left shell portions are considered part of the unit in question, the right shell portions are not and vice versa. For consistency, it will be considered in the following that the shell portions to the right side of a unit 100 are associated with that unit and the left ones are associated with the left adjacent unit.

FIG. 2 shows a close-up view of two of the aircraft passenger seat units (a right adjacent unit 100b and a left adjacent unit 100a) of FIG. 1, in a bed configuration 115. There is a moveable partition 170 provided by the shell structure between the two adjacent seats. This shell structure between the seats (i.e. belonging to the seat unit 100a towards the top of the figure, to the left) is moveable from a lowered position 172 (as shown) and a raised position. The raised position 171 is shown by a similar movable partition 170 shown to the right of the right adjacent seat unit 100b.

The partition(s) 170 can be raised to the raised position 171. Here, the partition 170 provides privacy to block sight lines between the two seats of the adjacent units 100. The partition(s) 170 can be lowered to the lowered position 172. Importantly, the lowered position 172 is beneath the height of the bed surface of the seat in its bed configuration 115. Hence, when both adjacent seats are in the bed configuration 115, and the partition between the seats 110 is lowered to the lowered position 172, a double bed surface is effectively formed.

The raised position 171 is at a height of 100 cm above the cabin floor. The lowered position 172 is at a height of 39 cm above the cabin floor.

Figure 3:
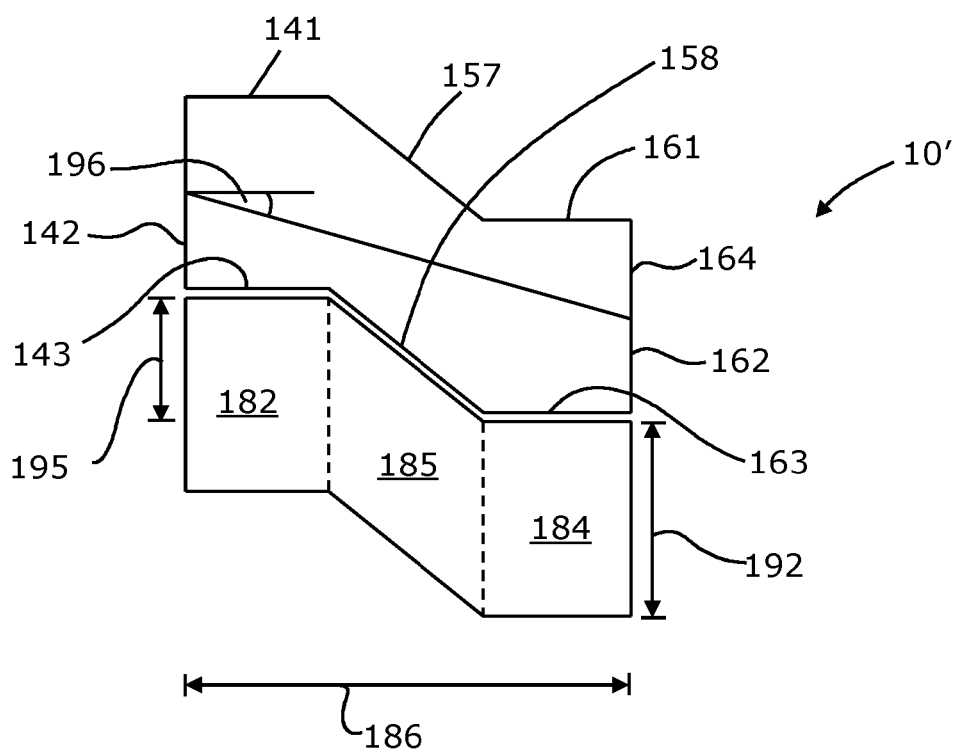
FIG. 3 shows a plan schematic view of an aircraft cabin arrangement including two aircraft passenger seat units, according to a second embodiment of the invention.

FIG. 3 shows a plan schematic view of an aircraft cabin arrangement 10' including two aircraft passenger seat units, according to a second embodiment of the invention. This second embodiment is similar to the first, but differs in that the planform 180 and middle regions 185 are a different shape to that found in the first embodiment.

Specifically, the middle region 185 is in the form of a parallelogram (straight sided), rather than an S-sided shape. Hence, the left and right middle region shell portions 157, 158 provide straight sided shell portions, extending between the first end region and the second end region.

Figure 4:
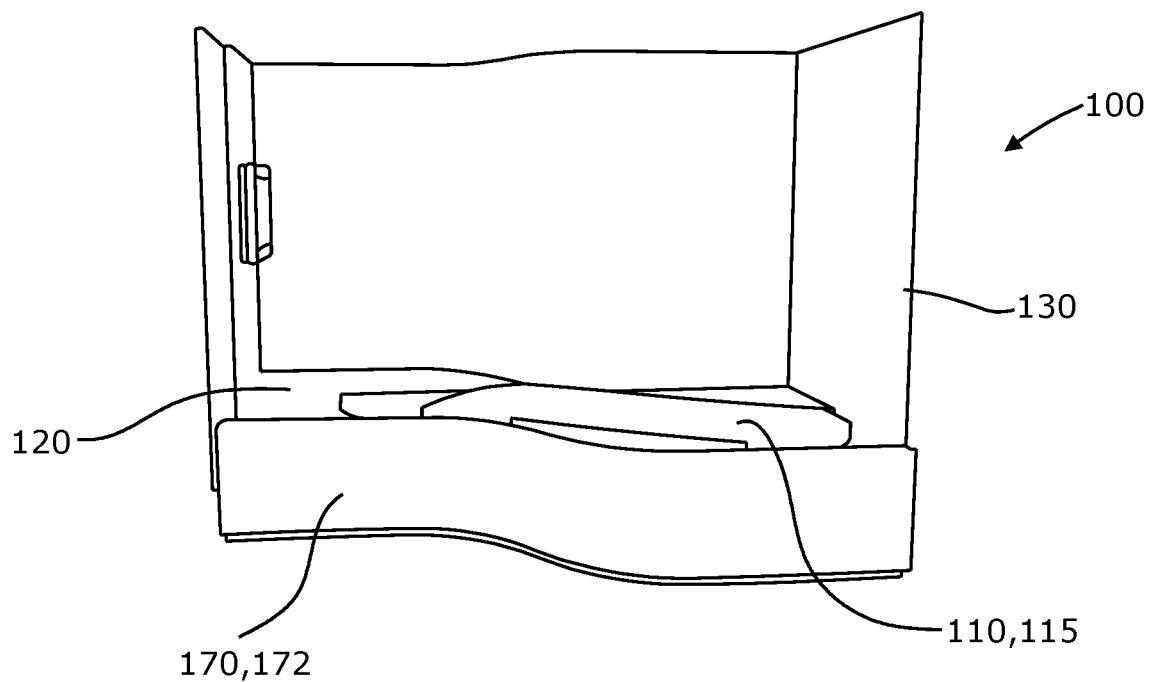
FIG. 4 shows side view of one of the units with the partition lowered.
Figure 5:
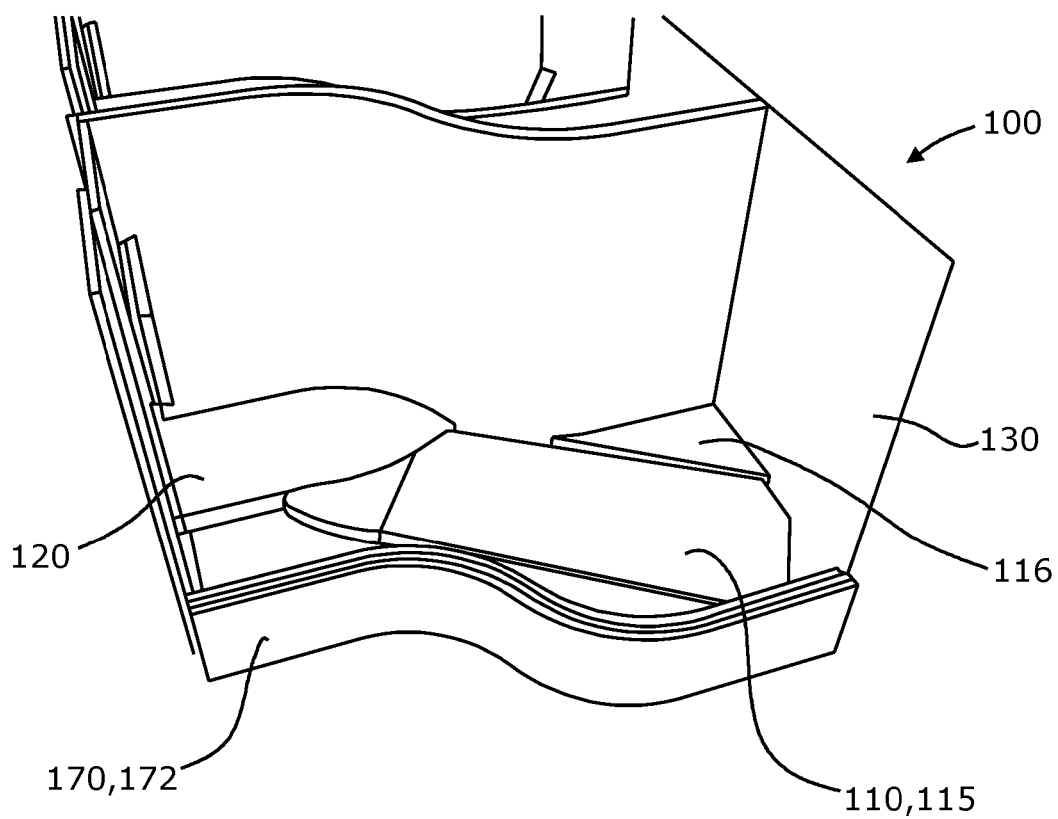
FIG. 5 shows a perspective view of FIG. 4.

FIG. 4 shows side view of one of the units with the partition lowered and FIG. 5 shows a perspective view of FIG. 4. Here, it can clearly be seen that the seat 110 is in the bed configuration 115, so as to form the bed surface with the ottoman 120. The moveable partition 170 is in the lowered position 172, which is below the bed level/height. It is also noted that FIG. 5 clearly shows a triangular support surface 116 adjacent and to the side of the seat 110 that is able to form part of the bed surface, as it is approximately level with the bed level/height.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The seats of the seat units adjacent one another may face in the same direction, as described above. Alternatively, they may face in opposite directions. For example, if the units are in a column of seat units, the seat units alternate in their facing direction along the column. Similarly, the seats 100 and ottomans 120 alternate as to which side of the column they are located. Similarly, the accessways 164 also alternate so that alternate seat units access alternate aisles 17, 18.

The description above describes a cabin layout with a middle column 16 being formed of seat units 100 according to the invention. There may be two such middle columns (i.e. not window/cabin wall-adjacent columns) formed of seat units 100 according to the invention.

The moveable partition 170 may not be provided along the entire length of the side shell portions (i.e. along the length of the unit). Instead, the moveable partition may be provided only on some or all of the middle region shell portions (157, 158), rather than also on some or all of the side first and second end region shell portions, as described above.

The seats 110 may be bench-style seats where, the bed surface in the bed configuration 115 is provided by a separate seat element, such as a fold-down element.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft passenger seat unit, the seat unit having a planform, the seat unit comprising:
   a passenger seat, the passenger seat having a seat pan and a backrest and the passenger seat being convertible between a seat configuration and a bed configuration, in which there is provided a bed surface at a bed height,
   a shell at least partially surrounding the passenger seat and defining the planform of the seat unit, the planform having:
      a length from a first end of the planform to a second opposite end of the planform,
      a first end region across the first end of the planform,
      a second end region across the second end of the planform, and
      a middle region extending from the first end region to the second end region,
      wherein the second end region is offset from the first end region in a direction transverse to the length of the planform, the second end region being offset by an offset distance, the shell further comprising a moveable partition, the moveable partition being moveable between a raised position, in which it blocks a sight line to or from the seat unit, and a lowered position, in which the sight line is unblocked,
   wherein the moveable partition is located adjacent the middle region and wherein, when in the lowered position, the partition is located under the bed height,
   wherein the first end region has a first width and the second end region has a second width, and
   wherein the first width and the second width are substantially the same such that the width of the planform at the first end is substantially the same as the width of the planform at the second end.

2. An aircraft passenger seat unit as claimed in claim 1, wherein the middle region has a third width and wherein the third width is substantially the same as the first width and/or the second width.

3. An aircraft passenger seat unit as claimed in claim 1, wherein the moveable partition is located adjacent the middle region along substantially the whole length of the middle region.

4. An aircraft passenger seat unit as claimed in claim 3, wherein the moveable partition is also located adjacent the first end region and/or adjacent the second end region.

5. An aircraft passenger seat unit as claimed in claim 3, wherein the middle region has a planform in the shape of a parallelogram.

6. An aircraft passenger seat unit as claimed in claim 3, wherein the middle region has a planform defined by two S-shape sides.

7. An aircraft passenger seat unit as claimed in claim 1, wherein the offset distance of the second end region is 30% to 70% of the width of the first end region, second end region or middle region.

8. An aircraft passenger seat unit as claimed in claim 1, wherein the length of the planform is approximately 200% to 250% of the width of the first end region, second end region or middle region.

9. An aircraft passenger seat unit as claimed in claim 1, wherein a planform angle is between 20 and 145 degrees.

10. An aircraft passenger seat unit as claimed in claim 1, wherein the backrest of the passenger seat, when in the seat configuration, is located towards the first end of the planform.

11. An aircraft passenger seat unit as claimed in claim 10, wherein the shell surrounds the back of the backrest of the passenger seat.

12. An aircraft passenger seat unit as claimed in claim 1, wherein the seat unit comprises an ottoman located towards the second end of the planform.

13. An aircraft passenger seat unit as claimed in claim 12, wherein the shell at least partially surrounds a side of the ottoman facing the second end of the planform.

14. An aircraft passenger seat unit as claimed in claim 12, wherein an accessway into the seat unit is provided on the opposite side of the second end of the planform to the side where the ottoman is located.

15. Two aircraft passenger seat units, each aircraft passenger seat unit being as claimed in claim 1, wherein the two aircraft passenger seat units are arrangeable side-by-side so that a moveable partition of one of the seat units is adjacent the other seat unit, and such that the moveable partition is moveable to the lowered position under the bed height so as to provide for passage between the two seat units above the bed height.

16. An aircraft seating cabin arrangement, wherein the arrangement comprises a column of a plurality of aircraft passenger seat units as claimed in claim 1, the column extending longitudinally along an aircraft cabin, and wherein the aircraft passenger seat units are arranged side-by-side in the column such that the moveable partition of each of the seat units is located adjacent another seat unit in the column.

17. An aircraft seating cabin arrangement as claimed in claim 16, wherein the arrangement comprises at least three columns, including at least one middle column and two outer columns, the at least one middle column being separated on each of its two longitudinal sides from another of the columns by an aisle.

* * * * *